United States Patent
Kolk et al.

(10) Patent No.: US 6,742,347 B1
(45) Date of Patent: Jun. 1, 2004

(54) FEEDFORWARD CONTROL FOR ABSORPTION CHILLER

(75) Inventors: Richard Kolk, Glastenbury, CT (US); David M. Martini, Liverpool, NY (US); Darren Sheehan, West Hartford, CT (US); Neil Jenkins, Collegeville, PA (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/337,586

(22) Filed: Jan. 7, 2003

(51) Int. Cl.[7] .............................................. F25B 13/00
(52) U.S. Cl. .......................................... 62/148; 700/44
(58) Field of Search ....................... 62/148; 236/78 D; 700/44, 45

(56) References Cited

U.S. PATENT DOCUMENTS

| | | | |
|---|---|---|---|
| 4,696,167 A | * | 9/1987 | Matsui et al. ................. 62/180 |
| 5,724,823 A | | 3/1998 | Martini et al. ................. 62/148 |
| 6,305,182 B1 | | 10/2001 | Gupte et al. ................. 62/324.2 |
| 6,440,374 B1 | * | 8/2002 | Jelinek ......................... 422/108 |

* cited by examiner

Primary Examiner—William Wayner
(74) Attorney, Agent, or Firm—Wall Marjama & Bilinski LLP

(57) ABSTRACT

A feedforward control method for an absorption chiller includes determining the disturbance transfer function, determining the capacity valve transfer function, measuring the actual disturbance, and implementing the feedforward control function in a feedforward controller. The feedforward control function is represented by the ratio of the disturbance transfer function divided by the capacity valve transfer function. The disturbance transfer function and the capacity valve transfer function are measured by applying a known amplitude input perturbation to the disturbance or capacity valve and recording the resulting perturbation in the output leaving chilled water temp. The disturbance transfer function is then the ratio of the delta leaving chilled water temperature divided by the delta change in the disturbance. The capacity transfer function is the ratio of the delta leaving chilled water temperature divided by the delta change in the capacity valve.

5 Claims, 3 Drawing Sheets

FEEDFORWARD CONTROL FOR ABSORPTION CHILLER

FIELD OF THE INVENTION

This invention relates generally to the field of absorption chillers, and more particularly to a feedforward control for an absorption chiller.

BACKGROUND OF THE INVENTION

Absorption chillers differ from mechanical vapor compression chillers in that they utilize a thermal or chemical process to produce the refrigeration effect necessary to provide chilled water. There is no mechanical compression of the refrigerant taking place within the machine as occurs within more traditional vapor compression type chillers. Most commercial absorption chillers use lithium bromide (a salt) and water as the fluid pair, with lithium bromide being the absorbent and water being the refrigerant. In order to produce the refrigeration effect necessary to make, for example, 44 F chilled water, the shellside of the machine must be maintained in a deep vacuum to allow the refrigerant (water) to boil at approximately 40 F. The lithium bromide solution absorbs the vaporized refrigerant, diluting it before it is pumped to the generator section of the machine where heat is added to reconcentrate the dilute solution. The water vapor boiled off in the generator is then condensed, returning to the evaporator as liquid. The reconcentrated lithium bromide returns to the absorber section as a strong solution to begin the cycle again.

In an absorption chiller, the chilled water temperature is directly affected by disturbances such as the cooling water temperature and the entering chilled water temperature. These disturbances are slowly removed by existing capacity control systems slowly as a result of the slow machine dynamics that exist between the burner and the leaving chilled water temperature. The result is poor transient temperature regulation of the leaving chilled water temperature.

SUMMARY OF THE INVENTION

Briefly stated, a feedforward control method for an absorption chiller includes determining the disturbance transfer function, determining the capacity valve transfer function, measuring the actual disturbance, and implementing the feedforward control function in a feedforward controller. The feedforward control function is represented by the ratio of the disturbance transfer function divided by the capacity valve transfer function. The disturbance transfer function and the capacity valve transfer function are measured by applying a known amplitude input perturbation to the disturbance or capacity valve and recording the resulting perturbation in the output leaving chilled water temp. The disturbance transfer function is then the ratio of the delta leaving chilled water temperature divided by the delta change in the disturbance. The capacity transfer function is the ratio of the delta leaving chilled water temperature divided by the delta change in the capacity valve.

According to an embodiment of the invention, a feedforward control method for an absorption chiller system, wherein a control input for said chiller is a heat source controlled by a capacity valve, and wherein said capacity valve is controlled by a feedforward controller, includes the steps of (a) determining a disturbance transfer function between a measured disturbance input into said system and a leaving chilled water output; (b) determining a capacity valve transfer function between said capacity valve and said leaving chilled water output; (c) measuring an actual disturbance introduced into said system; and (d) controlling said capacity valve based on a feedforward control transfer function in said feedforward controller, wherein said feedforward control transfer function is represented by a ratio of said disturbance transfer function to said capacity valve transfer function.

According to an embodiment of the invention, a feedforward controller for an absorption chiller system, wherein a control input for said chiller is a heat source controlled by a capacity valve, and a system output is a leaving chilled water temperature, includes a feedforward loop having a feedforward control transfer function represented by a ratio of a disturbance transfer function to a capacity valve transfer function, wherein said feedforward control transfer function receives a disturbance input as an input; a first summer receiving both a set point input and a feedback from a system transfer function as inputs, and sending an output to a capacity control transfer function; a second summer receiving an output from said capacity control transfer function and an output from said feedforward control transfer function, and sending an output to said system transfer function; said system transfer function receiving said output from said second summer as an input, and also receiving said disturbance input as an input, wherein an output of said system transfer function is said leaving chilled water temperature.

According to an embodiment of the invention, a feedforward control for an absorption chiller system, wherein a control input for said chiller is a heat source controlled by a capacity valve, and wherein said capacity valve is controlled by a feedforward controller, includes means for determining a disturbance transfer function between a measured disturbance input into said system and a leaving chilled water output; means for determining a capacity valve transfer function between said capacity valve and said leaving chilled water output; means for measuring an actual disturbance introduced into said system; and means for controlling said capacity valve based on a feedforward control transfer function in said feedforward controller, wherein said feedforward control transfer function is represented by a ratio of said disturbance transfer function to said capacity valve transfer function.

DETAILED DESCRIPTION OF THE PREFERRED EMBODIMENT

Figure 1:
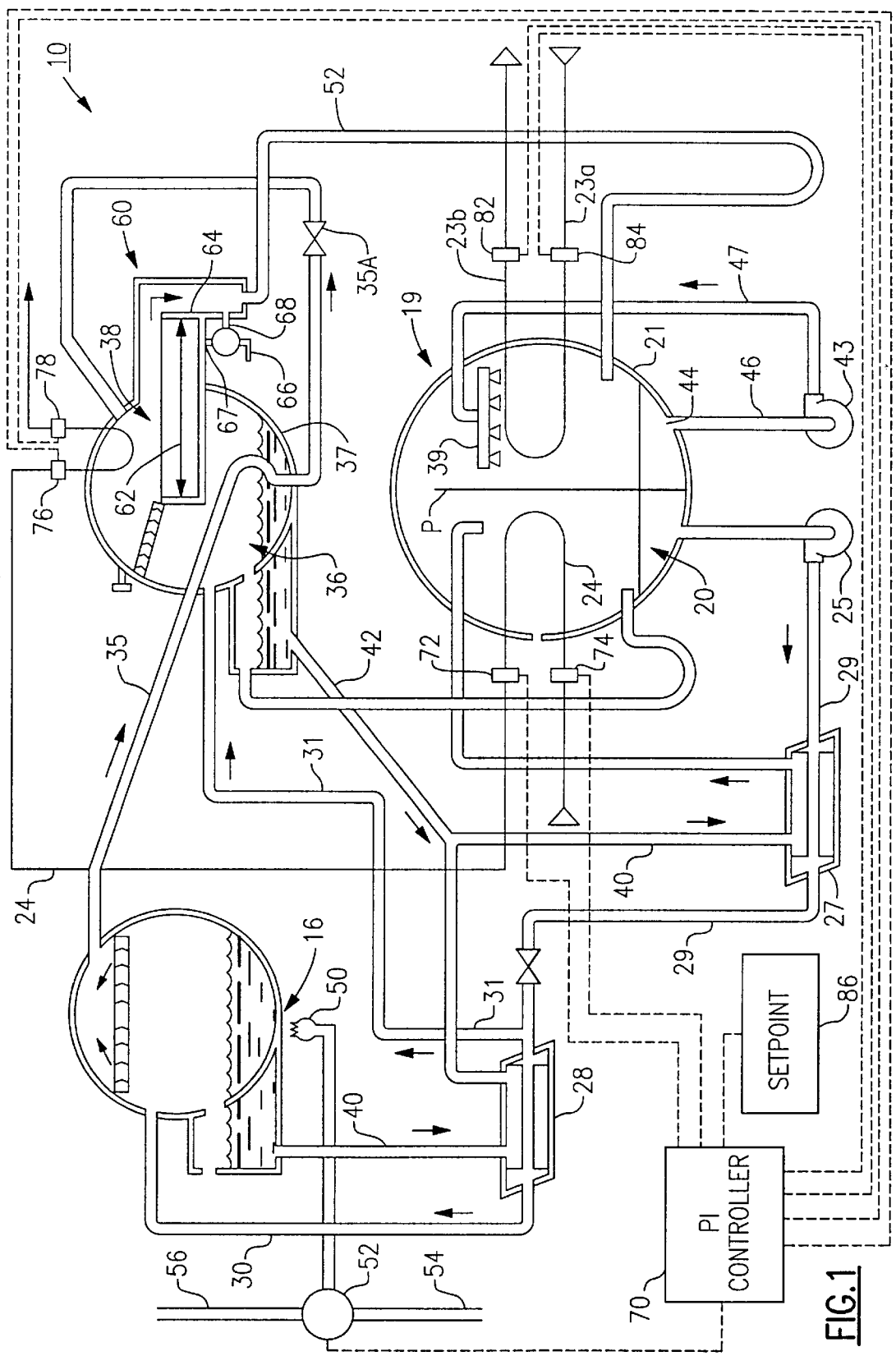
FIG. 1 shows a system diagram of a direct or steam fired double effect series flow absorption chiller that is controlled by an embodiment of the invention.

Referring to FIG. 1, a schematic representation of an absorption chiller system 10 is shown. Other types of absorption systems may use more or fewer stages, and may use a parallel rather than a series cycle. It will therefore be understood that the absorption system of FIG. 1 is only representative one of the many types of absorption systems that might have been selected to provide a descriptive background for the description of the invention. The control method and apparatus of the invention may be applied to any of these types of heating and cooling systems.

The absorption chiller system 10 is a closed fluidic system that operates in either a cooling mode or in a heating mode, depending upon the concentration of the absorbent in the refrigerant-absorbent solution and on the total quantity of liquid within the system. When system 10 operates in its cooling mode, the solution preferably has a first, relatively high concentration of the absorbent, i.e., is relatively strong or refrigerant poor, while the total quantity of liquid within the system is relatively small. When system 10 operates in its heating mode, the solution preferably has a second, relatively low concentration of the absorbent, i.e., is weak or refrigerant-rich, while the total quantity of liquid within the system is relatively large. In the following brief description of the operation of system 10 in these modes, it is assumed that system 10 employs water as a refrigerant and lithium bromide, which has a high affinity for water, as the absorbent.

System 10 includes an evaporator 19 and an absorber 20 mounted in a side-by-side relationship within a common shell 21. When system 10 is operating in its cooling mode, liquid refrigerant used in the process is vaporized in evaporator 19 where it absorbs heat from a fluid, usually water, that is being chilled. The water being chilled is brought through evaporator 19 by an entering chilled water line 23a and a leaving chilled water line 23b. Vaporized refrigerant developed in evaporator 19 passes to absorber 20 where it is combined with an absorbent to form a weak solution. Heat developed in the absorption process is taken out of absorber 20 by means of a cooling water line 24.

The weak solution formed in absorber 20 is drawn therefrom by a solution pump 25. This solution is passed in series through a first low temperature solution heat exchanger 27 and a second high temperature solution heat exchanger 28 via a delivery line 29. The solution is brought into heat transfer relationship with relatively strong solution being returned to absorber 20 from the two generators, high temperature generator 16 and low temperature generator 36, employed in the system, thereby raising the temperature of the weak solution as it moves into generators 16, 36.

Upon leaving low temperature solution heat exchanger 27, a portion of the solution is sent to low temperature generator 36 via a low temperature solution line 31. The remaining solution is sent through a high temperature solution heat exchanger 28 and then to high temperature generator 16 via a solution line 30. The solution in high temperature generator 16 is heated by a burner 50 to vaporize the refrigerant, thereby removing it from the solution. Burner 50 is fed from a gas line 54 and an air line 56 via a capacity valve 52. Controlling valve 52 controls the amount of heat delivered to the system. Alternately, the heat delivered to the system comes from a steam line controlled by a steam valve (not shown). The refrigerant vapor produced by high temperature generator 16 passes through a vapor line 35, low temperature generator 36, and a suitable expansion valve 35A to a condenser 38. Additional refrigerant vapor is added to condenser 38 by low temperature generator 36, which is housed in a shell 37 along with condenser 38. In low temperature generator 36, the weak solution entering from line 31 is heated by the vaporized refrigerant passing through vapor line 35 and added to the refrigerant vapor produced by high temperature generator 16. In condenser 38, refrigerant vapor from both generators 16, 36 are placed in heat transfer relationship with the cooling water passing through line 24 and condensed into liquid refrigerant.

Refrigerant condensing in condenser 38 is gravity fed to evaporator 19 via a suitable J-tube 52. The refrigerant collects within an evaporator sump 44. A refrigerant pump 43 is connected to sump 44 of evaporator 19 by a suction line 46 and is arranged to return liquid refrigerant collected in sump 44 back to a spray head 39 via a supply line 47. A portion of the refrigerant vaporizes to cool the water flowing through chilled water line 23. All of the refrigerant sprayed over chilled water line 23 is supplied by refrigerant pump 43 via supply line 47.

Strong absorbent solution flows from the two generators 16, 36 back to absorber 20 to be reused in the absorption cycle. On its return, the strong solution from high temperature generator 16 is passed through high temperature solution heat exchanger 28 and through low temperature solution heat exchanger 27 via solution return line 40. Strong solution leaving low temperature generator 36 is connected into the solution return line by means of a feeder line 42 which enters the return line at the entrance of low temperature solution heat exchanger 27.

Sensors are emplaced in various parts of system 10, including temperature sensors 72, 74, 76, and 78 in cooling water line 24, temperature sensor 82 in the leaving chilled water line 23b, and temperature sensor 84 in the entering chilled water line 23a. The outputs of these sensors are connected to a controller such as PI controller 70. Controller 70 also includes a connection to capacity valve 52, in addition to receiving input from a thermostat, shown here as a set point 86.

The chilled water temperature in the leaving chilled water line 23b is directly affected by disturbances such as the entering chilled water temperature (sensor 84) in water line 23a and the entering cooling water temperature (sensor 74) in cooling water line 24. Because the only control point for the system is capacity valve 52, and because the system is chemical-based, the machine dynamics of the system are relatively slow. Changes created by the disturbances mentioned above are removed slowly by the existing capacity control. A solution to this problem is to measure each disturbance and develop a feedforward control function which converts the disturbance to an equivalent capacity command increment, and then subtract the increment from the existing capacity command. The result is a faster system response to attenuate the effects of the disturbance and obtain more precise temperature regulation during transients.

Figure 2:
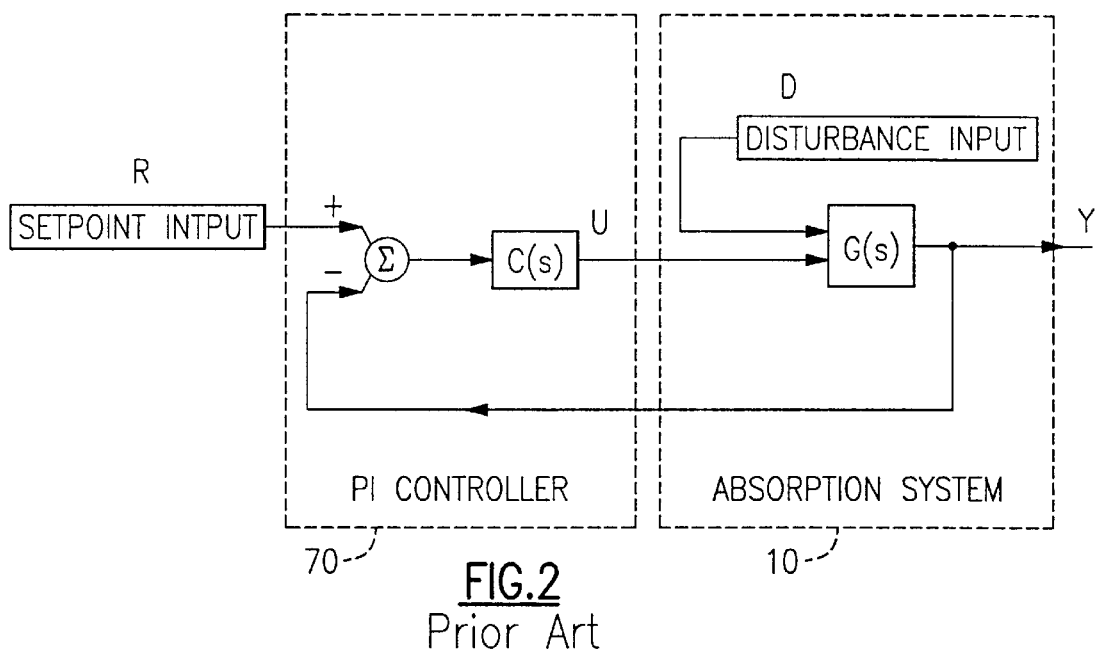
FIG. 2 shows a prior art control schematic for an absorption chiller system.

Referring to FIG. 2, a control schematic is shown for absorption chiller system 10. The existing capacity control law is shown as C(s), while G(s) is the transfer function for absorption system 10. The Small Signal Model of G(s) is represented as $$Y = Y_0 + \frac{\partial Y}{\partial U}\Delta U + \frac{\partial Y}{\partial D}\Delta D, \text{ where}$$

$$\Delta U \equiv U - U_0, \Delta D \equiv D - D_0, G_u(s) \equiv \frac{\partial Y}{\partial U}, G_D(s) \equiv \frac{\partial Y}{\partial D}$$

or, after substitution, $\Delta Y = G_u(S)\Delta U + G_D(S)\Delta D$. Y is the leaving chilled water temperature, U is the capacity valve position, and D is the disturbance, either the entering chilled water temperature or the entering cooling water temperature.

Defining a feedforward control law, $\Delta \tilde{U}$, as $\Delta \tilde{U} \equiv \Delta U - \Delta U_D$, where $$\Delta U_D = \frac{G_D(s)}{G_U(s)} \Delta D, \text{ then the Small Signal System equation using the new}$$

control $\Delta \tilde{U}$ becomes:

$$\Delta Y = G_u(s)\Delta \tilde{U} + G_D(s)\Delta D$$

$$\Delta Y = G_u(s)(\Delta U - \Delta U_D) + G_D(s)\Delta D$$

$$\Delta Y = G_u(s)\left(\Delta U - \frac{G_D(s)}{G_U(s)}\Delta D\right) + G_D(s)\Delta D$$

$$\Delta Y = G_u(s)\Delta U - G_D(s)\Delta D + G_D(s)\Delta D, \text{ or}$$

$$\Delta Y = G_u(s)\Delta U.$$

Figure 3:
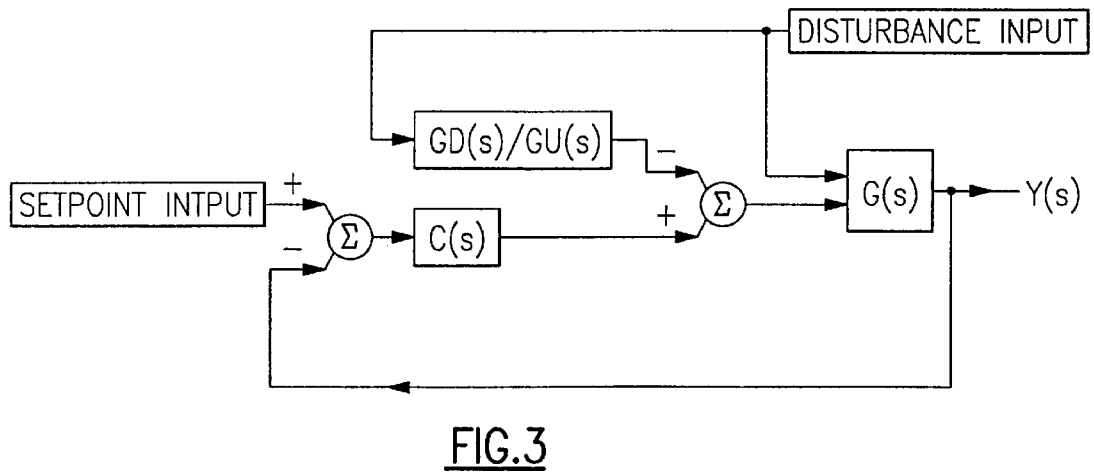
FIG. 3 shows a control schematic according to an embodiment of the invention, where the existing capacity control law is shown as C(s), with the feedforward control law represented by Gd(s)/Gu(s)

The process for implementing the feedforward control then becomes (1) computing the transfer functions Gd(s) and Gu(s), (2) measuring the disturbance signal D, and then (3) implementing the feedforward control as shown in FIG. 3.

Referring to FIG. 3, the existing capacity control law is shown as C(s), with the feedforward control law represented by Gd(s)/Gu(s). The disturbance transfer function, Gd(s), is the transfer function from the measured disturbance input, d(s), to the leaving chilled water output, y(s). Similarly, Gu(s) is the capacity valve transfer function from capacity valve 50 to the leaving chilled water output. In this embodiment, the steady state gain for both Gd(s) and Gu(s) is used, but in general, a full dynamic transfer characteristic can be used to capture any significant dynamics or to wash out any offset values which may prevail.

Gd and Gu are measured by applying a known amplitude input perturbation and recording the perturbation in the output leaving chilled water temp. Gd is then the ratio of the delta leaving chilled water temperature divided by the delta change in the disturbance. Gu is the ratio of the delta leaving chilled water temperature divided by the delta change in the capacity valve.

During machine testing, the entering chilled water and the entering cooling water are perturbed individually, and the change in the leaving chilled water temperature is examined. Normally three points are used (low load, mid load, and high load), with a single sensitivity being the average of the three measurements.

The load is based on the temperature difference between the entering chilled water temp and the chilled water setpoint temperature, usually around 42–44 degrees F. For the entering chilled water temperature, high load means the entering chilled water temperature is 7 degrees F. (or more) higher than the chilled water setpoint temperature, mid load means the entering chilled water temperature is about 3 to 7 degrees F. higher than the chilled water setpoint temperature, and low load means the entering chilled water temperature is 0 to 3 degrees F. higher than the chilled water setpoint temperature.

With respect to the entering cooling water temp, the the entering cooling water temperature is normally around 70–80 degrees F. Fans in the cooling tower are used to maintain this temperature. When a storm approaches, this temperature can vary rapidly, sometime by a drop of up to 10 degrees F., which is considered to be a large disturbance.

The feedforward control design was based on a controlled environment in which precise control of both the entering chilled water temperature and the entering cooling water temperature were possible. Two disturbance amplitudes, low and high, were applied to each of these temperatures. For the low disturbance amplitude, approximately +/−3 degrees F. for both entering chilled water temp and entering cooling water temp was used. For the high disturbance amplitude, approximately +/−7 degrees F. was used for both. The governing disturbance response was found to be at the high amplitude disturbance, so the resulting sensitivity based on this high amplitude disturbance was used as the single sensitivity for each of the feedforward controls. Although a more precise table of sensitivities could have been constructed by using more data points, it is not believed that there would be much additional improvement on the behavior of the algorithms.

Figure 4:
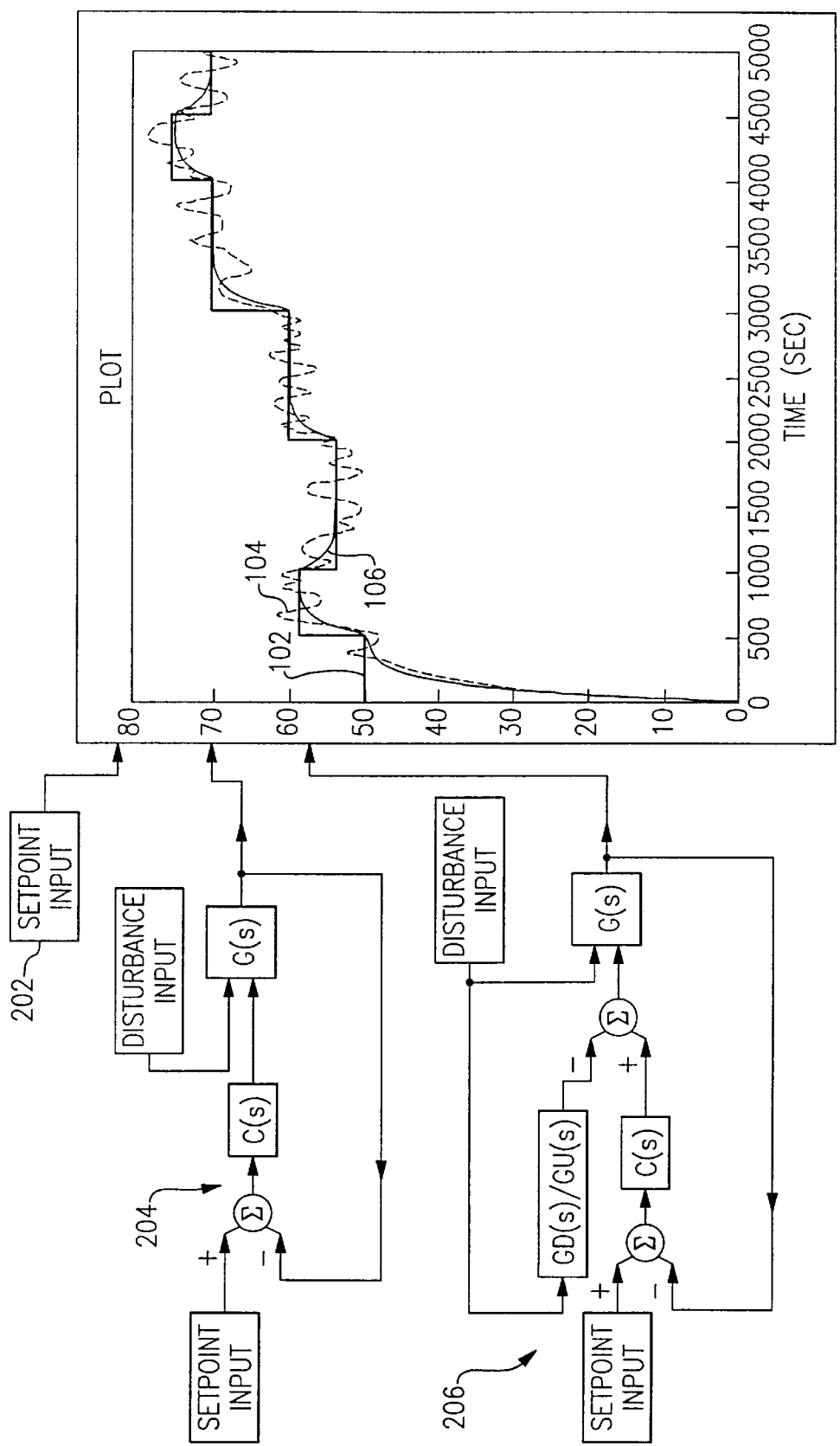
FIG. 4 shows simulation results are shown for the response of the different control methods of FIG. 2 and FIG. 3 to a +/− unit random variation around the set point.

Referring to FIG. 4, simulation results are shown for the response of the different control methods to a +/− unit random variation around the set point. The solid black line 102 shows the response from the set point input 202 by itself. The dotted line 104 shows the response from the conventional PI control, shown at 204, in which the disturbance effect is removed but subject to the delays inherent in processing the effect through normal feedback. Notice the wide oscillations of the response that settle rather slowly whenever the set point remains unchanged. The dash-dot line 106 shows the response from the feedforward control as shown at 206. The effect of the disturbance is removed from the system almost immediately. Setpoint transient tracking is visibly improved over the conventional PI controller.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A feedforward control method for an absorption chiller system, wherein a control input for said chiller is a heat source controlled by a capacity valve, and wherein said capacity valve is controlled by a feedforward controller, comprising the steps of:

determining a disturbance transfer function between a measured disturbance input into said system and a leaving chilled water output;

determining a capacity valve transfer function between said capacity valve and said leaving chilled water output;

measuring an actual disturbance introduced into said system; and controlling said capacity valve based on a feedforward control transfer function in said feedforward controller, wherein said feedforward control transfer function is represented by a ratio of said disturbance transfer function to said capacity valve transfer function.

2. A method according to claim 1, wherein said disturbance transfer function is determined by applying a known amplitude input perturbation to said system and recording an output perturbation in said leaving chilled water output, and defining said disturbance transfer function as a ratio of a first delta change to a second delta change, wherein said first delta change is a delta change of said leaving chilled water output before said application of said input perturbation to said leaving chilled water output after application of said input perturbation, and said second delta change is a delta change of said input perturbation to said output perturbation.

3. A method according to claim 2, wherein said capacity valve transfer function is determined by applying a known amplitude input perturbation to said system and recording an output perturbation in said leaving chilled water output, and defining said capacity valve transfer function as a ratio between said first delta change to a third delta change, wherein said third delta change is a delta change of said capacity valve after said input perturbation is applied to said system.

4. A feedforward controller for an absorption chiller system, wherein a control input for said chiller is a heat source controlled by a capacity valve, and a system output is a leaving chilled water temperature, comprising:

a feedforward loop having a feedforward control transfer function represented by a ratio of a disturbance transfer function to a capacity valve transfer function, wherein said feedforward control transfer function receives a disturbance input as an input;

a first summer receiving both a set point input and a feedback from a system transfer function as inputs, and sending an output to a capacity control transfer function;

a second summer receiving an output from said capacity control transfer function and an output from said feedforward control transfer function, and sending an output to said system transfer function;

said system transfer function receiving said output from said second summer as an input, and also receiving said disturbance input as an input, wherein an output of said system transfer function is said leaving chilled water temperature.

5. A feedforward control for an absorption chiller system, wherein a control input for said chiller is a heat source controlled by a capacity valve, and wherein said capacity valve is controlled by a feedforward controller, comprising:

means for determining a disturbance transfer function between a measured disturbance input into said system and a leaving chilled water output;

means for determining a capacity valve transfer function between said capacity valve and said leaving chilled water output;

means for measuring an actual disturbance introduced into said system; and means for controlling said capacity valve based on a feedforward control transfer function in said feedforward controller, wherein said feedforward control transfer function is represented by a ratio of said disturbance transfer function to said capacity valve transfer function.

* * * * *